April 3, 1956   R. GORDON ET AL   2,740,643
CARRIAGE WHEEL CLEANING DEVICE
Filed July 20, 1953   2 Sheets-Sheet 2

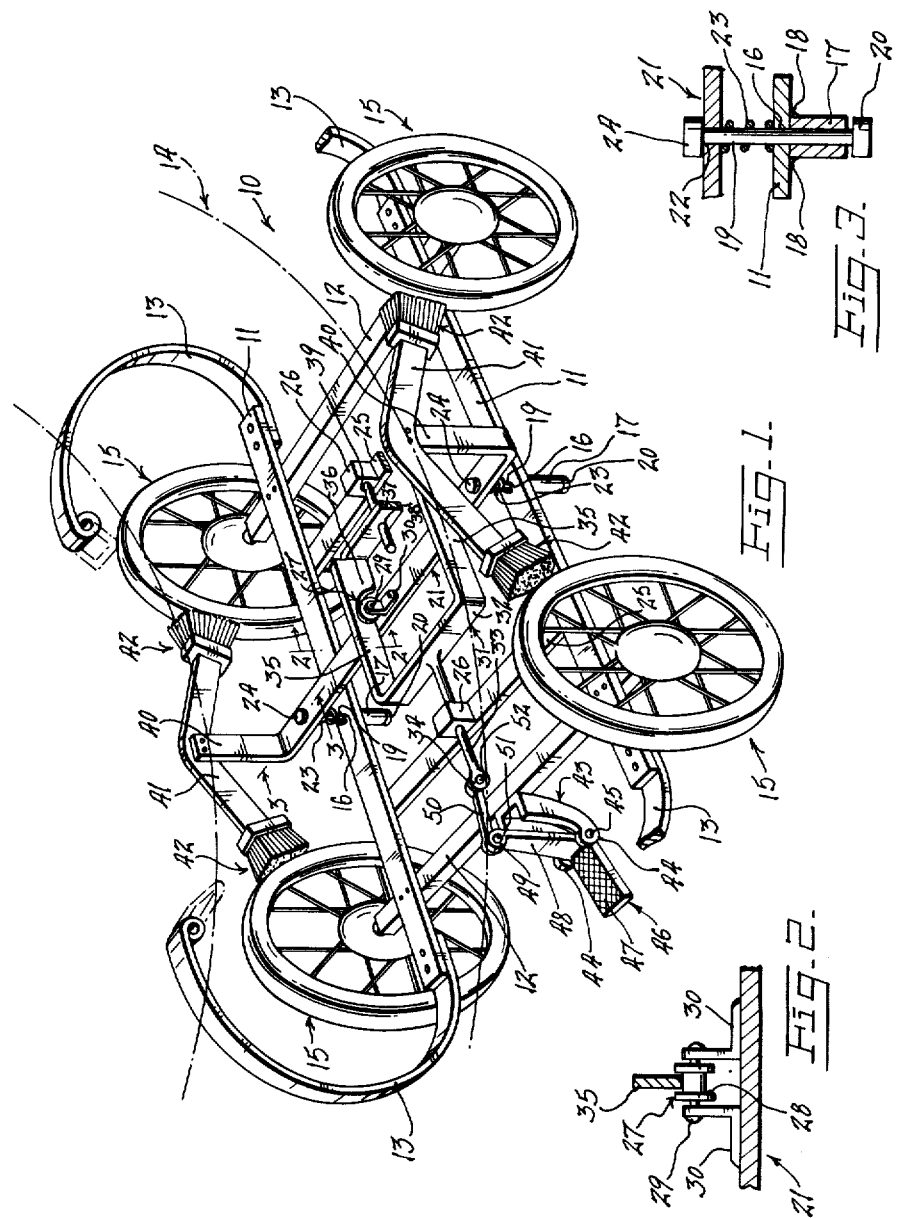

INVENTORS
REUBEN GORDON
BY HASKELL HAIT
ATTORNEY

United States Patent Office 2,740,643
Patented Apr. 3, 1956

2,740,643

CARRIAGE WHEEL CLEANING DEVICE

Reuben Gordon, Brooklyn, and Haskell Hait, New York, N. Y.

Application July 20, 1953, Serial No. 368,861

8 Claims. (Cl. 280—158)

This invention relates to baby carriages and, more particularly, to a carriage wheel cleaning device.

It is an object of the present invention to provide a carriage wheel cleaning device including suitable brush elements located near the outside periphery of each of the wheels, these brushes being adapted to be lowered by a suitable lever into operative engagement with the wheels so that when the carriage is pushed the wheels may be cleaned of dust and mud before the carriage is pushed into the house from the street.

It is another object of the present invention to provide a carriage wheel cleaning device of the above type wherein the brush elements may be brought into operative engagement with the wheel by means of either a suitable handle near the top of the carriage or by a foot pedal located between the rear wheels after the manner of a brake pedal.

It is still another object of the present invention to provide a carriage wheel cleaning device of the above type wherein the brush elements are concealed in carriage fenders, rendering the same substantially invisible.

Other objects of the present invention are to provide a carriage wheel cleaning device bearing the above objects in mind which is of simple construction, inexpensive to manufacture, has a minimum number of parts, is easy to use and efficient in operation.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a fragmentary perspective view of the chassis of a carriage embodying the features of the present invention, the upper portion of the carriage being shown only in dotted outline.

Fig. 2 is a vertical sectional view taken along line 2—2 of Fig. 1.

Fig. 3 is a vertical sectional view taken along line 3—3 of Fig. 1.

Referring more in detail to the drawings, in which similar reference numerals identify corresponding parts throughout the several views, there is shown in Figs. 1–3 a baby carriage embodying the features of the present invention and referred to collectively as 10.

Figures 4, 5:
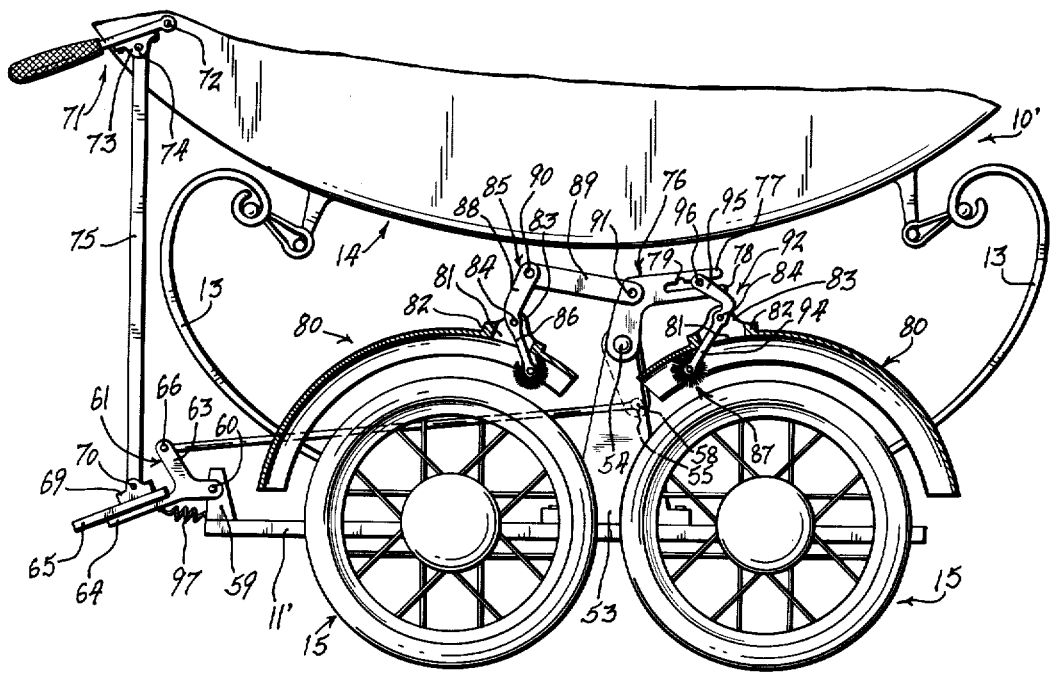
Fig. 4 is a side elevational view of a modified form of the present invention with the fenders broken away.
Fig. 5 is an enlarged, fragmentary perspective view of the mechanism of the brush manipulating device.

The carriage 10 includes a pair of longitudinal chassis bars 11 connected by cross bars 12, the ends of bars 11 fixedly carrying the usual springs 13. The carriage body 14, shown only in dotted lines, is supported on springs 13 in the usual manner, while the cross bars 12 serve to mount the wheels 15, substantially as illustrated.

In the practice of our invention, the bars 11 at their midpoint are provided with transversely aligned openings 16. Hollow cylindrical members 17 are secured to the undersurfaces of bars 11 directly below openings 16 by means of welding 18, as shown in Fig. 3.

Pins 19 are slidable vertically in openings 16 and members 17, the lower ends of the pins being provided with enlargements 20 adapted to abut the bottom of members 17 and limit thereby the upward displacement of pins 19.

A flat transverse bar 21 is provided at each end with openings 22 receiving the upper ends of pins 19, expansion springs 23 sleeving the pins 19 intermediate the bars 11 and bar 21, serving thereby to normally support the latter in freely spaced relation to the bars 11. The top ends of pins 19 are provided with enlargements 24 adapted to abut the top surface of bar 21 surrounding openings 22 whereby to limit the downward displacement of pins 19.

A pair of cross bars 25 are secured to the bars 11 on either side of bar 21 and fixedly mount longitudinally aligned bearing members 26.

A pair of rollers 27 having peripheral grooves 28 are rotatably mounted on the top of bar 21 by means of shafts 29 and L-shaped bearing brackets 30, the rollers being located on either side of bearing members 26 inwardly of pins 19.

A yoke-shaped member 31 fixedly carries on its transverse side 32 a shaft 33 slidable longitudinally in the rearmost bearing member 26, the free end of shaft 33 having an enlargement 34.

The ends of transverse side 32 are integrally formed with longitudinal sides 35 extending at right angles thereto, the sides 35 along their lower edges and at their ends remote from the side 32 being integrally formed with cam surfaces 36. A transverse side 37 integrally connects the ends of cam surfaces 36, completing the yoke-shaped member 31.

The lower edges of sides 35 are slidably disposed in the peripheral grooves 28 of rollers 27, as shown in Fig. 2, the transverse side 37 having an opening 38 aligned with shaft 33 and which slidably receives a shaft 39 fixedly mounted in bearing member 26. Thus the yoke-shaped member 31 is free to move longitudinally but not vertically.

The ends of bar 21 are integrally formed with vertical portions 40 which fixedly carried inverted V-shaped arms 41 at their tops, the ends of arms 41 fixedly carrying brush elements 42 adapted to engage the periphery of wheels 15 upon downward movement of bar 21 against the action of springs 23.

As a means of effecting this downward movement, a downwardly extending, channel-shaped member 43 is secured to the rearmost cross bar 12 at its center, the sides of member 43 at the bottoms thereof being integrally formed with ears 44 which rotatably mount a shaft 45, as shown in Fig. 1. An L-shaped lever 46 is rotatably mounted at its center on shaft 45 between the ears 44, this lever consisting of a horizontal portion 47 and a vertical portion 48, the latter at its top terminating in an enlargement 49. A link arm 50 is pivotally connected at one end to enlargement 49 by means of a pin 51, and at the other end to enlargement 34 of shaft 33 by means of pin 52.

Thus, when the horizontal portion 47 of lever 46 is pressed downwardly by the foot, the portion 48 thereof will rotate downwardly and away from bearing member 26. This pulls shaft 33 rearwardly by means of link arm 50, as will be obvious. As shaft 33 moves rearwardly, the yoke member 31 and, more particularly, sides 35 along the lower edges thereof also move rearwardly in the grooves 28 of rollers 27 until the bottom edges of cam surfaces 36 pass rearwardly into the grooves 28. Since the yoke-shaped member 31 cannot move vertically, the rollers 27 are forced downwardly, compressing springs 23 and moving bar 21 downwardly, as will be obvious.

This latter movement brings the brush elements 42 into operative engagement with the peripheries of wheels 15, cleaning the wheels 15 of dust and mud before the carriage is pushed into the house from the street, eliminating the soiling of rugs and floors occasioned by carriages now in use.

Upon release of pressure on lever 46 by the foot, the springs 23 will force the elements 42 to their raised inoperative position again. Thus it is only necessary to push the carriage back and forth while applying pressure to portion 47 of lever 46 with one foot to completely remove all mud and dirt from the peripheries of the carriage wheels in an easy and ready manner, prior to entering the house.

It will be readily understood that any other operator means may be employed to actuate the brush elements 42 than that shown, without departing from the scope of the invention. For example, the portion 47 may be moved by an upwardly extending shaft, the later being actuated at its upper end by a suitable manually operable handle pivotally mounted near the top of the body 14. In such a case, the brush elements could be actuated either by hand or by foot, as desired.

Referring now particularly to Figs. 4 and 5, there is shown a modified form of the invention, referred to collectively as 10', and differing from the first form in the actuating mechanism for the brush elements.

In this form, a pair of transversely aligned, upwardly extending bearing members 53 are mounted on longitudinal chassis bars 11', the latter now being of L-shaped cross section for greater strength. These bearing members 53 at their tops rotatably mount a transverse shaft 54, as shown in Fig. 5, the ends of shaft 54 extending outwardly beyond bearing members 53. The center of shaft 54 fixedly carries a radial arm 55 by means of an integrally formed hub 56 therein and a screw 57. The outer end of radial arm 55 is provided with an opening 58 for a purpose to be hereinafter described.

An upwardly extending bearing member 59 is mounted at the center of rearmost cross bar 12', also of L-shaped cross section, the bearing member 59 rotatably mounting a transverse shaft 60. A pair of L-shaped members 61 are rotatably mounted on each side of bearing member 59 by means of integrally formed ears 62 provided at their midpoints, the ears 62 having aligned openings which receive the shaft 60, as shown in Fig. 5. The horizontal portions 64 of members 61 are secured together in spaced relation by means of a horizontal pedal 65 suitably secured along their upper edges, the latter also serving to rotate the members 61 about the shaft 60 when pressed downwardly by the foot. The upper ends of the vertical portions 63 of members 61 are provided with transversely aligned openings which receive a shaft 66 therethrough. A connecting arm 67 is pivotally mounted on the shaft 66 intermediate the portions 63 by means of an enlargement 69 receiving the shaft 66 therethrough, the other end of arm 67 being laterally bent at right angles to itself, as at 68, and being pivotally received within opening 58.

A pair of bearing brackets 69 are fixedly mounted on the top of pedal 65 at each longitudinal side thereof, and rotatably mount a shaft 70 for a purpose to be referred to hereinafter.

A manually operable handle 71 is rotatably mounted at the side of body 14 by means of a pin 72, and is provided on its bottom edge with a pair of bearing brackets 73 which mount a shaft 74.

A connecting arm 75 is rotatably mounted at its top end on shaft 74 intermediate brackets 73, and at its bottom end on shaft 70 intermediate brackets 69, permitting rearward movement of shaft 67 to be effected by either pressing on pedal 65 with the foot or moving handle 71 downwardly by hand, as will be obvious.

A pair of L-shaped arms 76 are fixedly carried at the ends of shaft 54, as shown in Fig. 5, the horizontal portions 77 of these arms being provided with longitudinal slots 78 extending inwardly from the free ends thereof. Each of the slots 78 at the top thereof is provided with a semicircular extension 79 for a purpose which will hereinafter become clear.

Arcuate fenders 80 are suitably mounted at each side of body 14, substantially as illustrated in Fig. 4, and receive therewithin in freely spaced relationship the upper halves of wheels 15, in the usual manner of such constructions.

Each fender 80 at the top thereof is provided with an opening 81, rings 82 being suitably secured to the upper surface of each fender 80 surrounding openings 81. The rings 82 at each side are integrally formed with ears 83 which mount shafts 84.

V-shaped arms 85 are rotatably mounted at their centers on the two rearmost shafts 84 intermediate ears 83, the bottom portions 86 thereof passing downwardly through openings 81 and carrying at their ends rotatable brush elements 87, while the top portions 88 thereof pass upwardly through openings 81 and are pivotally connected to link arms 89 by means of pins 90. The other ends of link arms 90 are pivotally connected to the middle portions of arms 76 by means of pins 91.

L-shaped arms 92 are pivotally mounted at enlarged portions 93 thereof on the two frontmost shafts 84 intermediate ears 83, the bottom portions 94 thereof passing downwardly through openings 81 and carrying at their ends rotatable brush elements 87, while the top portions 95 thereof pass upwardly through openings 81 and are pivotally and slidably connected to arms 76 by means of pins 96, the latter riding the slots 78.

As shown in Fig. 4, the brush elements 87 are normally out of engagement with the peripheries of wheels 15 when the radial arm 55 is in a substantially vertical position, due to the position and arrangement of arms 76, 85 and 92.

However, upon rearward movement of arm 67, occasioned by either stepping down on pedal 65 or rotating handle 71 downwardly, the arms 76 will be rotated in a clockwise direction about shaft 54. This moves pins 96 toward extensions 79 and rotates arms 92 in a counter-clockwise direction about shafts 84, bringing brush elements 87 into engagement with wheels 15. The same clockwise movement of arms 76 rotates arms 85 in a clockwise direction by means of arms 89, bringing brush elements 87 into engagement with wheels 15. When the pins 96 have moved sufficiently, they will engage extensions 79 of slots 78, locking the four brush elements 87 in operative engagement with the wheels 15. Thus, by pushing the carriage 10' forward, or back and forth, the wheels 15 will rotate against the rotatable brush elements 87 to remove mud and dirt before entering the house. To release the pins 96 from extensions 79 of slots 78, it is only necessary to pull the handle 71 upwardly, or urge the pedal 65 in the same direction with the foot, moving the brush elements 87 out of engagement with the wheels and permitting the carriage to be used in the normal manner.

An expansion spring 97 may be provided intermediate the bottom of pedal 65 and the side of bearing member 59 to insure that the brush elements 87 will normally be out of engagement with wheels 15.

It should now be apparent that there has been provided a carriage wheel cleaning device including suitable brush elements located near the outside periphery of each of the wheels, these brushes being adapted to be lowered by a suitable lever into operative engagement with the wheels so that when the carriage is pushed the wheels may be cleaned of dust and mud before the carriage is pushed into the house from the street. It should also be apparent that there has been provided a carriage wheel cleaning device of the above type wherein the brush elements may be brought into operative engagement with the wheel by means of either a suitable handle near the top of the carriage or by a foot pedal located between the rear wheels after the manner of a brake pedal, the brush elements being concealed in carriage fenders, rendering the same substantially invisible. By means of this arrangement, the brushes may also be cleaned by actuating the brake pedals while the cleaned wheels are rotating.

While we have illustrated and described the preferred embodiments of our invention, it is to be understood that we do not limit ourselves to the precise construction herein disclosed and the right is reserved to all changes and modifications coming within the scope of the invention as defined in the appended claims.

Having thus described our invention, what we claim as new, and desire to secure by United States Letters Patent is:

1. A cleaning device for a baby carriage comprising a plurality of brush elements, means for mounting said elements near the periphery of each of the carriage wheels, and operator means for bringing said elements into abutment with the periphery of each wheel whereby to permit the wheels to rotate against said elements and to remove dirt therefrom, said mounting means comprising a pair of transversely aligned bearing members mounted on the chassis of the carriage below the body portion thereof, a transverse shaft rotatable in and extending beyond said bearing members, fenders surrounding and freely spaced from the top portions of the wheels, each of said fenders having an opening above the wheels, first substantially L-shaped arms rotatably mounted near their middle portions above each of said fender openings, said first L-shaped arms extending downwardly through said fender openings to terminate short of the peripheries of each of the wheels, said brush elements being rotatable on the lower ends of each of said first L-shaped arms, said first L-shaped arms extending upwardly through said fender openings toward said transverse shaft, a pair of second substantially L-shaped arms fixedly carried at each end of said transverse shaft and extending upwardly and horizontally toward one pair of said first L-shaped arms, the free ends of said pair of second L-shaped arms having inwardly extending slots, pins carried by the upper ends of said pair of said first L-shaped arms and slidable in said slots, and a pair of link arms pivotally connected at one end to the central portion of said pair of second L-shaped arms and at the other to the tops of the other pair of said first L-shaped arms.

2. A cleaning device for a baby carriage comprising a plurality of brush elements, means for mounting said elements near the periphery of each of the carriage wheels, and operator means for bringing said elements into abutment with the periphery of each wheel whereby to permit the wheels to rotate against said elements and to remove dirt therefrom, said mounting means comprising a pair of transversely aligned bearing members mounted on the chassis of the carriage below the body portion thereof, a transverse shaft rotatable in and extending beyond said bearing members, fenders surrounding and freely spaced from the top portions of the wheels, each of said fenders having an opening above the wheels, first substantially L-shaped arms rotatably mounted near their middle portions above each of said fender openings, said first L-shaped arms extending downwardly through said fender openings to terminate short of the peripheries of each of the wheels, said brush elements being rotatable on the lower ends of each of said first L-shaped arms, extending upwardly through said fender openings toward said transverse shaft, a pair of second substantially L-shaped arms fixedly carried at each end of said transverse shaft and extending upwardly and horizontally toward one pair of said first L-shaped arms, the free ends of said pair of second L-shaped arms having inwardly extending slots, pins carried by the upper ends of said pair of first L-shaped arms and slidable in said slots, and a pair of link arms pivotally connected at one end to the central portion of said pair of second L-shaped arms and at the other to the tops of the other pair of said first L-shaped arms, said slots near their inner ends along their upper edges having extensions laterally directed to form detents adapted to releasably engage said pins carried by the upper ends of said pair of first L-shaped arms whereby to lock said brush elements against the wheels.

3. A cleaning device for a baby carriage comprising a plurality of brush elements, means for mounting said elements near the periphery of each of the carriage wheels, and operator means for bringing said elements into abutment with the periphery of each wheel whereby to permit the wheels to rotate against said elements and to remove dirt therefrom, said mounting means comprising a pair of transversely aligned bearing members mounted on the chassis of the carriage below the body portion thereof, a transverse shaft rotatable in and extending beyond said bearing members, fenders surrounding and freely spaced from the top portions of the wheels, each of said fenders having an opening above the wheels, first substantially L-shaped arms rotatably mounted near their middle portions above each of said fender openings, said first L-shaped arms extending downwardly through said fender openings to terminate short of the peripheries of each of the wheels, said brush elements being rotatable on the lower ends of each of said first L-shaped arms, said first L-shaped arms extending upwardly through said fender openings toward said transverse shaft, a pair of second substantially L-shaped arms fixedly carried at each end of said transverse shaft and extending upwardly and horizontally toward one pair of said first L-shaped arms, the free ends of said pair of second L-shaped arms having inwardly extending slots, pins carried by the upper ends of said pair of said first L-shaped arms and slidable in said slots, and a pair of link arms pivotally connected at one end to the central portion of said pair of second L-shaped arms and at the other to the tops of the other pair of said first L-shaped arms, said operator means comprising a third substantially L-shaped member having a horizontal portion and a vertical portion rotatably mounted at its center at the rear of the chassis, said horizontal portion being adapted to be pressed downwardly by foot, a radial arm fixedly carried by said transverse shaft intermediate the ends thereof, and a link arm pivotally connected at one end to the top of said vertical portion and at the other to the end of said radial arm whereby downward movement of said horizontal portion will rotate said transverse shaft and said L-shaped arms.

4. A cleaning device for a baby carriage comprising a plurality of brush elements, means for mounting said elements near the periphery of each of the carriage wheels, and operator means for bringing said elements into abutment with the periphery of each wheel whereby to permit the wheels to rotate against said elements and to remove dirt therefrom, said mounting means comprising a pair of transversely aligned bearing members mounted on the chassis of the carriage below the body portion thereof, a transverse shaft rotatable in and extending beyond said bearing members, fenders surrounding and freely spaced from the top portions of the wheels, each of said fenders having an opening above the wheels, first substantially L-shaped arms rotatably mounted near their middle portions above each of said fender openings, said first L-shaped arms extending downwardly through said fender openings to terminate short of the peripheries of each of the wheels, said brush elements being rotatable on the lower ends of each of said first L-shaped arms, said first L-shaped arms extending upwardly through said fender openings toward said transverse shaft, a pair of second substantially L-shaped arms fixedly carried at each end of said transverse shaft and extending upwardly and horizontally toward one pair of said first L- shaped arms, the free ends of said pair of second L-shaped arms having inwardly extending slots, pins carried by the upper ends of said pair of said first L-shaped arms and slidable in said slots, and a pair of link arms pivotally connected at one end to the central portion of said pair of second L-shaped arms and at the other to the tops of the other pair of said first L-shaped arms, said operator means comprising a third substantially L-shaped member having a horizontal portion and a vertical portion rotatably mounted at its center at the rear of the chassis, said horizontal portion being adapted to be pressed downwardly by foot, a radial arm fixedly carried by said transverse shaft intermediate the ends thereof, and a link arm pivotally connected at one end to the top of said vertical portion and at the other to the end of said radial arm whereby downward movement of said horizontal portion will rotate said transverse shaft and said L-shaped arms, a manually operable handle rotatably mounted at one side of the carriage directly above said third L-shaped member, and a second link arm pivotally connected at its upper end to said handle and at its bottom end to the horizontal portion of said third L-shaped member.

5. A cleaning device for carriage wheels mounted on a carriage frame, a transverse shaft rotatably mounted on said frame, manually actuated means engaging said shaft for rotation, L-shaped arms fixed on the ends of said shaft, said arms having longitudinal slots, V-shaped arms secured to said L-shaped arms, and rotatable brush elements secured in said V-shaped arms, said brushes being adapted to clean said wheels, said carriage frame including fenders over the wheels, and slots in said fenders, said brush elements extending through said slots to engage the wheels.

6. The combination of claim 5, wherein said brush elements and the V-shaped arms are pivotally mounted on said fenders intermediate their lengths, and the upper portions are pivotally and slidably connected in the longitudinal slots.

7. The combination of claim 6 wherein said V-shaped arms are pivotally connected to the L-shaped arms by a horizontal link.

8. The combination of claim 5, wherein said shaft actuating means comprises a radial arm mounted on said shaft, a connecting rod secured to said radial arm, and manually operated means pivotally connected to said connecting rod.

References Cited in the file of this patent

UNITED STATES PATENTS

| 942,471 | Stark | Dec. 7, 1909 |
| 983,196 | Anderson | Jan. 31, 1911 |
| 1,194,875 | Pfeil | Aug. 15, 1916 |
| 1,272,352 | Allen | July 16, 1918 |

FOREIGN PATENTS

| 725,684 | France | Feb. 15, 1932 |
| 4,640 | Great Britain | Feb. 26, 1912 |
| 16,164 | Great Britain | June 5, 1897 |
| 44,447 | Switzerland | Apr. 7, 1909 |